US010098815B2

(12) United States Patent
Zerebny

(10) Patent No.: US 10,098,815 B2
(45) Date of Patent: Oct. 16, 2018

(54) BOTTLE SUPPORT SHOE WITH SUCTION BASE

(71) Applicant: Matthew Zerebny, Hemet, CA (US)

(72) Inventor: Matthew Zerebny, Hemet, CA (US)

(*) Notice: Subject to any disclaimer, the term of this patent is extended or adjusted under 35 U.S.C. 154(b) by 0 days.

(21) Appl. No.: 15/422,888

(22) Filed: Feb. 2, 2017

(65) Prior Publication Data
US 2017/0231869 A1     Aug. 17, 2017

Related U.S. Application Data

(60) Provisional application No. 62/295,224, filed on Feb. 15, 2016.

(51) Int. Cl.
A61J 1/16      (2006.01)
F16B 47/00     (2006.01)
B65D 23/00     (2006.01)
B65D 25/24     (2006.01)

(52) U.S. Cl.
CPC .............. *A61J 1/16* (2013.01); *B65D 23/001* (2013.01); *B65D 25/24* (2013.01); *F16B 47/00* (2013.01)

(58) Field of Classification Search
USPC ........... 220/483; 215/393, 289, 400; 211/74; 248/363, 205.5
See application file for complete search history.

(56) References Cited

U.S. PATENT DOCUMENTS

| 1,005,447 | A |   | 10/1911 | Mayo |
| 1,165,052 | A | * | 12/1915 | Williams ................ B41J 29/08 135/83 |
| 1,171,210 | A |   | 2/1916  | Keffer |
| 1,753,611 | A | * | 4/1930  | Lower ................. B43M 99/008 126/246 |
| 1,892,140 | A | * | 12/1932 | Fogler ................. B65D 51/249 222/105 |
| 2,819,108 | A | * | 1/1958  | Borah .................... A63B 47/02 294/187 |
| 2,940,713 | A | * | 6/1960  | Van Dusen ............ F16B 47/00 248/205.1 |
| 2,956,687 | A |   | 10/1960 | Robichaud |
| 2,963,256 | A | * | 12/1960 | Borah ................ A47G 23/0225 215/393 |
| 3,220,685 | A | * | 11/1965 | Himler ............... A47G 23/0241 248/133 |
| 3,982,716 | A |   | 9/1976  | Trees |

(Continued)

*Primary Examiner* — Muhammad Ijaz
(74) *Attorney, Agent, or Firm* — Vincent G. LoTempio; Kloss, Stenger & LoTempio; David T. Stephenson

(57) ABSTRACT

A bottle support shoe receives a closed end of a medicine bottle to stabilize and inhibit slippage of a medicine bottle, and to hold the bottle upright. The shoe comprises a plate having a superior face defined by a convex shape that creates suction, and a mount face defined by a concave shape that creates suction. An interior sidewall extends from the plate at an angle between 44 degrees to 110 degrees, such that engaging the superior face with the closed end of bottle creates air space between the interior sidewall and the superior face. Engaging the mount face with a ground surface decreases and maintains air space between the interior sidewall and the mount face. An exterior sidewall circumambulates the interior sidewall. A bridge extends from interior sidewall to exterior sidewall. A grip panel overlays the mount face to further prevent slippage of the shoe.

19 Claims, 4 Drawing Sheets

(56) References Cited

U.S. PATENT DOCUMENTS

| | | | |
|---|---|---|---|
| 4,623,112 A | 11/1986 | Olson | |
| 5,180,132 A * | 1/1993 | Pearson | A47G 23/0225 248/205.5 |
| 5,433,324 A * | 7/1995 | Leonard | A61J 7/04 206/446 |
| 5,660,292 A * | 8/1997 | Scholfield | A47G 19/22 220/212.5 |
| 6,571,976 B1 * | 6/2003 | Sonnabend | B65D 25/24 220/483 |
| 6,793,075 B1 * | 9/2004 | Jeter | A47G 19/2272 206/459.1 |
| 7,690,610 B2 * | 4/2010 | Ristau | F16B 47/00 248/205.5 |
| 8,626,309 B1 * | 1/2014 | Alshemari | A61N 1/375 607/57 |
| 9,521,919 B1 * | 12/2016 | Reyes | A47G 29/093 |
| 9,803,681 B2 * | 10/2017 | Esposito | F16B 47/00 |
| 2005/0205752 A1 * | 9/2005 | Pauli | B65D 23/001 248/680 |
| 2007/0012706 A1 * | 1/2007 | Deadman | B65D 81/3879 220/737 |
| 2016/0207678 A1 * | 7/2016 | Tuan | B65D 23/001 |
| 2016/0278557 A1 * | 9/2016 | Esposito | A47G 23/0225 |
| 2017/0231869 A1 * | 8/2017 | Zerebny | A61J 1/16 248/206.2 |
| 2018/0148222 A1 * | 5/2018 | Deutschle | B65D 25/108 |

* cited by examiner

BOTTLE SUPPORT SHOE WITH SUCTION BASE

CROSS REFERENCE OF RELATED APPLICATIONS

This application claims the benefits of U.S. provisional application No. 62/295,224, filed Feb. 15, 2016 and entitled MEDICINE BOTTLE SHOE, which provisional application is incorporated by reference herein in its entirety.

FIELD OF THE INVENTION

The present invention relates generally to a bottle support shoe with suction base. More so, a bottle support shoe is configured to receive a closed end of a medicine bottle for stabilizing and holding the medicine bottle in a desired orientation, and also configured to grip a ground surface while containing the medicine bottle for inhibiting slippage of the medicine bottle against the ground surface; whereby shoe comprises a plate having a superior surface with a convex shape and a mount face with a concave shape; whereby superior face and an interior wall create suction against closed end of bottle; whereby mount face and the interior wall create suction against ground surface; whereby exterior sidewall circumambulate the interior sidewall; and whereby a bridge extends between interior sidewall and exterior sidewall to enhance structural integrity.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, prescription drugs are dispensed by licensed pharmacists who manually count out the number of pills pertaining to a particular prescription and place them in an appropriately labeled container. Typically, pill and medicine bottles are used to store and dispense the pills. Drug companies often ship pills in bottles having screw-off caps, and pharmacies often repackage smaller numbers of pills into bottles, such as standard cylindrical brown bottles as are known in the art.

It is known that such bottles, whether from a drug manufacturer or pharmacy; often have safety mechanisms such as arrows on the cap and the bottle which must be lined up before the cap can be removed. Another common safety measure is requiring a user to push down on the cap before turning in order to remove the cap from the bottle. These safety mechanisms are often designed to ensure that children cannot open the bottles and swallow the pills inside, which, of course, can be very dangerous as they can choke.

Consequently, the safety mechanisms thwart adults from opening the bottles. The elderly, especially those with arthritis, or whose hands have lost their agility, and the uncoordinated amongst us often must struggle to open such pill bottles, or find a younger individual to help, which is sometimes ironically, a child or a teen who can open the bottle for us. Even healthy people struggle to open these caps with one hand, as the closed end of the bottle slips against a ground surface.

Other proposals have involved stabilizing medicine bottles. The problem with these bottle support devices is that they do not allow for one-handed manipulation of the cap. Also, the bottle often accidently detaches from the supportive device. Even though the above cited bottle support devices meet some of the needs of the market, a bottle support shoe with suction base that receives a closed end of a medicine bottle and creates a suction effect to stabilize and inhibit slippage of the medicine bottle, and to hold the bottle upright, and also inhibits slippage of the bottle against a ground surface by creating the suction against the ground surface is still desired.

SUMMARY

Illustrative embodiments of the disclosure are generally directed to a bottle support shoe with suction base. The bottle support shoe serves to receive a closed end of a medicine bottle and create a suction effect to stabilize and inhibit slippage of the medicine bottle, and to hold the bottle upright. The shoe inhibits slippage of the bottle against a ground surface by creating the suction against the ground surface, such as when torque is applied to the bottle cap to twist on or off the cap.

In some embodiments, the bottle support shoe may include a plate having a superior face defined by a convex shape with a convexity angle between 1.0 radian to 6.0 radians that creates suction, and a mount face defined by a concave shape with a convexity angle between 1.0 radian to 6.0 radians that creates suction. The plate further comprises an interior sidewall that extends from the plate, towards the superior face, at an angle between 44° to 110° relative to the plate.

The angle between the superior face and the interior sidewall are such that engaging the superior face with the closed end of bottle creates air space between the interior sidewall and the superior face. Similarly, engaging the mount face with a ground surface creates air space between the interior sidewall and the mount face. An exterior sidewall circumambulates the interior sidewall. A bridge extends from interior sidewall to exterior sidewall.

In one aspect of the present invention, a bottle support shoe with suction base for stabilizing a medicine bottle, comprises:
a plate defined by a superior face and a mount face, the superior face defined by a generally convex shape operable to create suction, the mount face defined by a generally concave shape operable to create suction;
an interior sidewall disposed to extend from the plate at an angle generally between 44° to 110°, the interior sidewall having a generally radius-shaped terminus,
whereby plate and interior sidewall form a cavity,
whereby engaging the superior face creates a first air space between the interior sidewall and the superior face;
an exterior sidewall disposed to extend from the plate, the exterior sidewall configured to circumambulate the interior sidewall,
whereby engaging the mount face creates a second air space between the interior sidewall and the mount face;
a bridge disposed to extend from the interior sidewall to the exterior sidewall, the bridge further configured to provide structural integrity to the shoe; and
a grip panel, the grip panel configured to at least partially overlay the mount face.

In a second aspect, the plate has a generally circular shape.

In another aspect, the convex shape of the superior face is defined by a convexity angle between 1.0 radian to 6.0 radians.

In another aspect, the convex shape of the superior face comprises a convexity angle of about 3.5 radians.

In another aspect, the interior sidewall is disposed to extend from the plate at an angle generally between 68° to 90°.

In another aspect, the exterior sidewall is configured to form a substantially cylindrical shape.

In another aspect, the exterior sidewall comprises a generally radius shape defined by an angle from about 1.0 radian to 6.0 radians.

In another aspect, the shoe is fabricated from at least one of the following: silicone, latex, rubber, open cell foam, closed cell foam, urethane, polyurethane elastomer, epoxy, Santoprene, and any generic materials with similar properties to the materials listed.

In another aspect, the shoe supports a bottle defined by a closed end and a bottle sidewall extending from the closed end forming a unitary structure with an aperture opening into an interior of the bottle, the closed end defined by a generally flat base.

In another aspect, the shoe is configured to receive a medicine bottle, the medicine bottle comprising a bottle sidewall and a bottle closed end.

In another aspect, the bottle closed end is configured to engage the superior face of the plate.

In another aspect, a flat ground surface, such as a table, engages the mount face of the plate.

In another aspect, the shoe further comprises a grip panel configured to at least partially overlay the mount face, whereby the grip panel helps grip the ground surface.

One objective of the present invention is to facilitate removal and attachment of a threaded or snap-fit cap on a medicine bottle.

Another objective is to enable one hand to twist a cap on and off a medicine bottle while the bottle rests on a ground surface.

Another objective is to stabilize a medicine bottle in an upright position.

Another objective is to create a suction effect in the cavity of the shoe to secure the medicine bottle in the shoe.

Yet another objective is to create a suction effect between the mount face and the interior sidewall to secure the shoe on the ground surface, such as a table.

Yet another objective is to enhance the grip of the shoe on the ground surface with a grip panel.

Yet another objective is to provide an inexpensive shoe for supporting a bottle.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
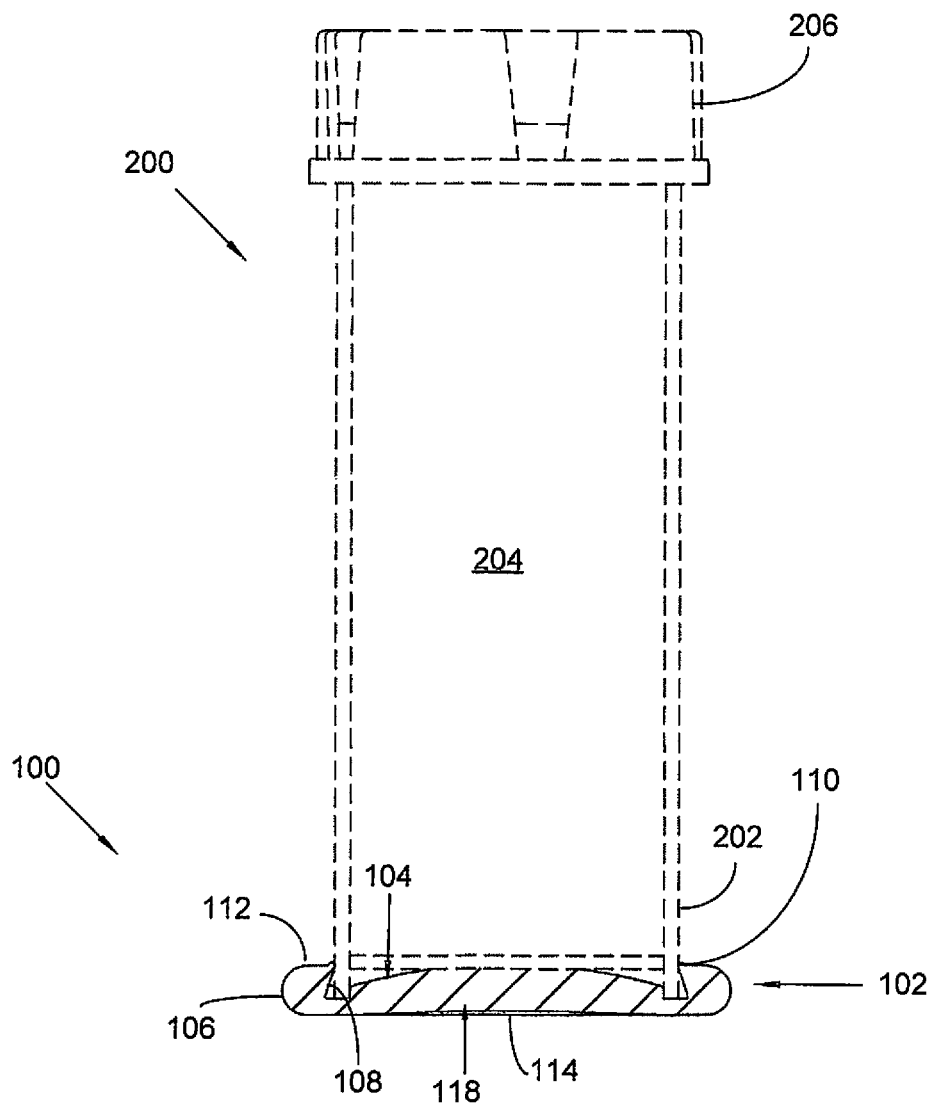
FIG. 1 illustrates a sectioned side view of an exemplary medicine bottle shoe receiving a medicine bottle, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

In one embodiment of the present invention presented in FIGS. 1-5, a bottle support shoe 100 with suction base, hereafter "shoe 100". Shoe 100 is configured to receive a medicine bottle 200 and create a suction effect to stabilize and inhibit slippage of the medicine bottle 200, and also to retain bottle 200 in an upright orientation. Bottle 200 may be defined by a continuous sidewall 204 that extends to form an open end having an aperture, and an opposite closed end 202. Shoe also inhibits slippage against a ground surface by creating suction against the ground surface, such as when torque is applied to the bottle cap 206 for twisting on or off the cap 206. This suction effect between bottle 200, shoe 100, and ground surface provides numerous advantageous.

For example, the removal and attachment of a threaded or snap-fit cap on a medicine bottle 200 is facilitated. Shoe 100 also enables one-handed twisting of a cap on and off the bottle 200 while the bottle rests on a ground surface. Further, while retaining the bottle 200 in the desired orientation, shoe 100 inhibits slippage of the bottle 200 against a ground surface when torque is applied to the bottle 200, such as when detaching or attaching a cap 206 with the bottle 200. In this manner, the shoe 100 retains the bottle 200 in an upright orientation, allows for one-handed manipulation of the bottle 200, protects a bottle closed end 202 from damage, and inhibits slippage and instability on the medicine bottle 200 when torque is applied to the cap of medicine bottle 200.

As referenced in FIG. 1, shoe 100 comprises a plate 102 having a superior face 104 and an opposite mount face 118. An interior sidewall 108 extends from the plate 102 at an angle between 44° to 110°. Plate 102 and interior sidewall 108 form a cavity 116. Engaging superior face 104 of plate 102 with bottle closed end 202 creates a first air space in cavity 116, between interior sidewall 108, superior face 104, bottle closed end 202, and bottle sidewall 204. Engaging mount face 118 with a ground surface creates a second air space between mount face 118, interior sidewall 108, and ground surface. An exterior sidewall 106 circumambulates interior sidewall 108. A bridge 112 extends from interior sidewall 108 to exterior sidewall 106. A grip panel 114 overlays the mount face 118, or superior face 104, or both to help prevent slippage of shoe 100 or bottle 200.

In some embodiments, superior face 104 is defined by a generally convex shape. In some embodiments, convex contour of superior face 104 follows a convexity angle between 1.0 radian to 6.0 radians that creates suction when engaged by bottle closed end 202. Mount face 118 is defined by a concave shape defined by a convexity angle between 1.0 radian to 6.0 radians that also creates suction, but with interior sidewall 108 and a ground surface, such as a table. Interior sidewall 108 extends from the plate 102, towards superior face 104, at an angle between 44° to 110° relative to plate 102. Interior sidewall 108 also terminates at a radius shaped terminus 110.

The angle between superior face 104 and interior sidewall 108 is such that engaging the superior face 104 with the bottle closed end 202 creates a first air space between the interior sidewall 108 and the superior face 104. Similarly, engaging the mount face 118 of plate 102 with a ground surface, such as a table or any flat surface, creates a second air space between mount face 118 and interior sidewall 108. Further, an exterior sidewall 106 circumambulates interior sidewall 108. A bridge 112 extends from interior sidewall 108 to exterior sidewall 106.

In one embodiment, shoe 100 is defined chiefly by a one piece body that can receive and support a medicine bottle 200 without requiring excessive manipulations or a separate piece of equipment or tools. The shoe 100 forms a generally cylindrical shape having a formed cavity 116 therein. Cavity 116 is adapted to a single size of medicine bottles 200. The shoe 100 is fabricated from a semi-rigid, resilient material which is efficacious for retaining the medicine bottle 200 as it positions in cavity 116. This unique configuration and material composition of shoe 100 protects the medicine bottle 200 from rough handling and easy manipulation (opening, closing, handling, etc.) of the medicine bottle 200 by one or two hands.

Further, shoe 100 is adapted to receive only a specific sized medicine bottle. Thus, shoe 100 is not a one-size-fits-all configuration. However, those skilled in the art will recognize that medicine containers, such as medicine bottles, utilize standard sizes. In one embodiment, the cylindrical configuration of the bottle is about 1/64" to 1" thick with an optimal thickness of 1/8". In another embodiment, medicine bottle may be a cylindrical pill bottle. Though other shapes and dimensions of medicine bottles may be used with accommodating shoes.

As referenced in FIG. 1, the shoe 100 may comprise a plate 102 having a superior face 104 to engage bottle closed end 202, and a mount face 118 to engage a ground surface. In some embodiments, plate 102 comprises a generally circular shape that conforms to the dimensions of medicine bottle 200. In one embodiment, a grip panel 114 overlays mount face 118. Grip panel 114 is configured to create a tacky, gripping, suction cup like effect on the ground surface to enable secure manipulation and alignment of shoe 100 and medicine bottle 200 without slippage against the ground surface.

Figure 2:
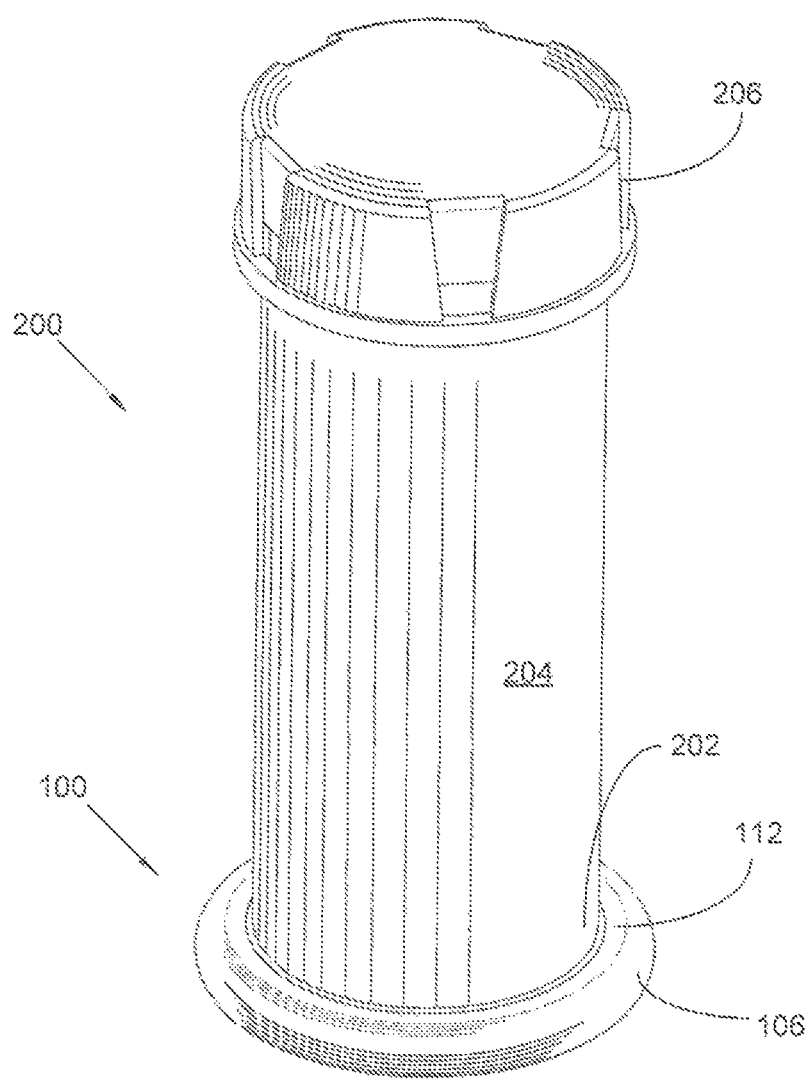
FIG. 2 illustrates a perspective view of an exemplary medicine bottle shoe receiving a medicine bottle, in accordance with an embodiment of the present invention.

Looking now at FIG. 2, shoe 100 may comprise a superior face 104 that forcibly retains a closed end 202 of medicine bottle 200. Superior face 104 is disposed generally coplanar to plate 102. In some embodiments, superior face 104 comprises a generally circular shape that conforms to the dimensions of medicine bottle 200.

In one embodiment, a grip panel 114 overlays mount face 118, or superior face 104, or both 118, 104. Grip panel 114 is configured to create a tacky, gripping, suction cup like effect on the ground surface or bottle closed end 202 to enable secure manipulation and alignment of medicine bottle 200 without slippage by shoe 100 or bottle 200.

Figure 3:
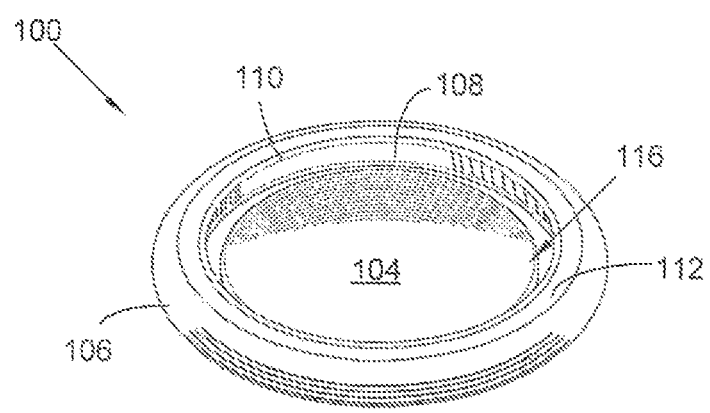
FIG. 3 illustrates a top angle perspective view of an exemplary medicine bottle shoe, in accordance with an embodiment of the present invention.

Further, as FIG. 3 shows, superior face 104 is defined by a generally convex shape. Though in other embodiments, superior face 104 may be substantially flat with a minute convex curvature. The convex shape of superior face 104 forms a vacuum against the bottle closed end 202. Specifically, the convex shape creates a suction cup effect by forcing the air out from between superior face 104 and interior sidewall 108 against bottle closed end 202. In one possible embodiment, the convex shape comprises a convexity angle between 1.0 radian and 6.0 radians. Though in other embodiments, convexity angle of 3.5 radians forms at superior face 104.

The unique convex surface of superior face 104 helps create a suction cup effect when medicine bottle 200 is pressed down and fills in the gap between the medicine bottle closed end 202 and the surfaces of interior sidewall 108 and superior face 104. Further, the suction effect between bottle closed end 202 and superior face 104 resists torque forces that are generated when the cap 206 of medicine bottle 200 is closed, opened, or manipulated in any way. It is significant to note that by not having any pattern on superior face 104, a greater surface area of contact is created, which also enhances the suction.

Figure 4:
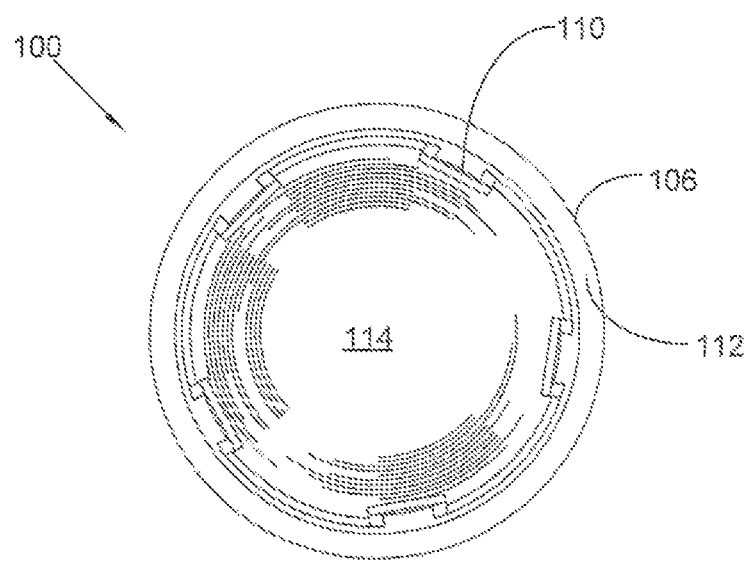
FIG. 4 illustrates a top view of an exemplary grip panel overlaying a superior face of a medicine bottle shoe, in accordance with an embodiment of the present invention.

Turning now to FIG. 4, shoe 100 may comprise an interior sidewall 108 that engages a medicine bottle 200 sidewall. Interior sidewall 108 and plate are defined by a cavity 116 that is sized and dimensioned to receive bottle 200. Interior sidewall 108 extends from superior face 104, terminating at a radius shaped terminus 110. In one embodiment, interior sidewall 108 forms a substantially cylindrical shape, similar to medicine bottle 200.

In one embodiment, radius shaped terminus 110 engages medicine bottle sidewall 204 at an angle that creates a snug engagement therebetween. Radius shaped terminus 110 is defined by an angle between 44° to 110°. This angle forms a tight engagement with bottle sidewall 204. Though in one embodiment, the angle is between 68° to 90°, so as to create an optimal grip with the bottle sidewall 204. Thus, the unique angle of radius shaped terminus 110 extending from interior sidewall 108 enhances the grip of shoe 100 to medicine bottle 200.

Similarly, the concave shape of mount face 118 and interior sidewall 108 are operable to create suction against a ground surface. In this manner, engaging the ground surface with mount face 118 creates a second air space between the interior sidewall 108 and the mount face 118. The suction effect between ground surface and mount face 118 resists torque forces against shoe 100 that are generated when the cap 206 of medicine bottle 200 is closed, opened, or manipulated in any way.

In some embodiments, shoe 100 may comprise an exterior sidewall 106 that encapsulates interior sidewall 108. Exterior sidewall 106 is configured to extend from the plate 102, generally coplanar to interior sidewall 108. Exterior sidewall 106 is further configured to circumambulate the interior sidewall 108. Shoe 100 is generally manipulated by gripping exterior sidewall 106. In one embodiment, exterior sidewall 106 forms a substantially cylindrical shape, similar to a medicine bottle.

In some embodiments, exterior sidewall 106 of shoe 100 ranges from being flat 90° angle, to having a generally radius shape from 1.0 radian to 6.0 radians. These dimensions create maximal strength for exterior sidewall 106 when medicine bottle 200 is being compressed into shoe 100.

In some embodiments, shoe 100 may comprise a bridge 112 that extends from interior sidewall 108 to exterior sidewall 106. Bridge 112 is configured to extend from interior sidewall 108 to exterior sidewall 106. Thus, bridge 112 provides structural integrity to shoe 100 by forming a bridge between exterior and interior sidewalls 106, 108.

Figure 5:
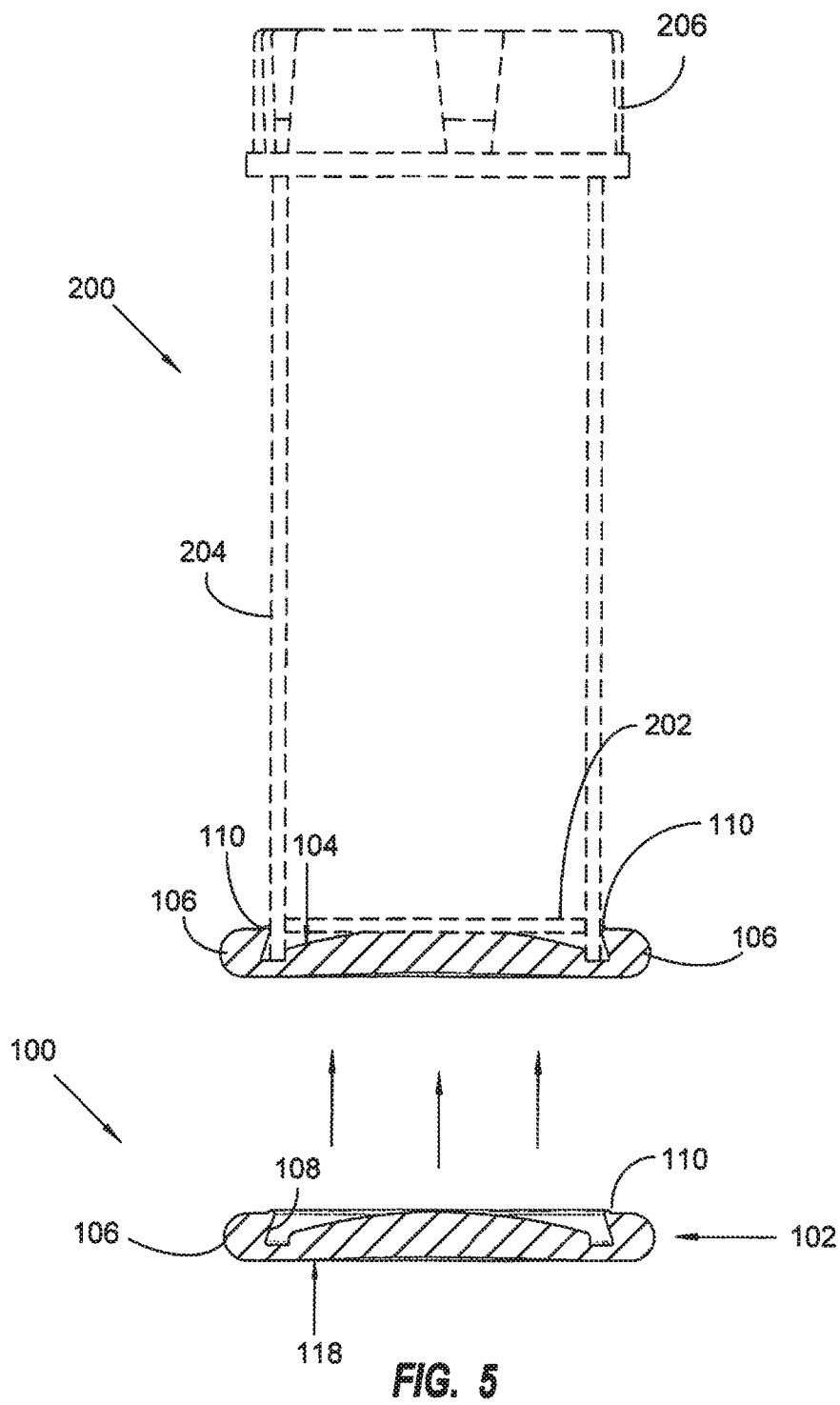
FIG. 5 illustrates a sectioned side view of an exemplary medicine bottle shoe receiving a medicine bottle, in accordance with an embodiment of the present invention.

In operation, FIG. 5 illustrates medicine bottle 200 joining the shoe 100, with the medicine bottle closed end 202 aligned with, and engaging the superior face 104. Interior sidewall 108 may then encapsulate the medicine bottle sidewall 204. Radius shaped terminus 110 engages medicine bottle sidewall 204 at the specific angle to form a snug fit. Mount face engages ground surface and creates a second air space confined between mount face 118, interior sidewall 108, and ground surface. Thus, as torque is applied to medicine bottle 200, plate 102 stabilizes and resists the generated torque. This unique stabilization is effective for one-handed opening and closing of cap 206 from medicine bottle 200.

Thus, shoe 100 has a primary function of providing traction to resist instability and torque forces applied to the medicine bottle 200—for example, like a shoe on a foot. In some embodiments, shoe 100 may be compressible as to provide traction, friction, or a catching type surface or the like that holds onto the bottom and side of a bottle of medicine and the ground surface that the medicine bottle 200 is sitting on. Shoe 100 may also be detached from medicine bottle 200, or remain engaged with medicine bottle 200 as a detachable attachment. In one embodiment, shoe 100 can be permanently integrated into medicine bottle 200, and not a separate component from medicine bottle 200. In another possible embodiment, shoe 100 is shaped like a circular cap only attaching to the bottle on the bottom and sides. In other alternative embodiments, the exterior and interior sidewalls 106, 108 of plate 102 may overlap bottle sidewall 204.

In one embodiment, shoe 100 is fabricated from a material that enables attachment to the side and bottom of a prescription medication bottle for the purpose of holding the bottle, preventing the bottle from slipping or moving when placed on a surface, or preventing the bottle from moving when trying to open or close the medicine bottle. The material composition of shoe 100 may include, without limitation, silicone, latex, rubber, open cell or closed cell foam, urethane, polyurethane elastomer, epoxy, Santoprene, and any materials with similar properties to the materials listed. This material helps to insure maximal protection of the bottle closed end 202 and bottle sidewall 204. The material of shoe 100 may include a solid or semi solid piece of material. Shoe 100 may be fabricated by injection mold, handmade, or machined. In one embodiment, shoe 100 utilizes a medical grade material for fabrication.

Turning back to FIG. 4, a grip panel 114 is configured to overlay mount face 118, or superior face 104, or both. Grip panel 114 creates a tacky, gripping, suction cup like effect on the ground surface or bottle closed end 202 for manipulation and alignment of medicine bottle 200. In one embodiment, grip panel 114 is fabricated from a material that ranges from a 20 Shore 00 to an 85 Shore D on the Durometer scale with optimal range at 5-95 on the Shore A Durometer scale. Grip panel 114 may also have a textured surface.

In one alternative embodiment, shoe 100 provides a secondary packaging component that generally serves one or more of the following additional functions: to provide protection from excessive transmission of moisture or solvents into or out of the packaging system; to provide protection from excessive transmission of reactive gases (atmospheric oxygen, inert headspace filler gas, or other organic vapors) into or out of the packaging system; to provide light protection for the packaging system; to provide protection for a packaging system that is flexible or needs extra protection from rough handling; and to provide an additional measure of microbiological protection (i.e., by maintaining sterility or by protecting the packaging system from microbial intrusion).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A bottle support shoe with a suction base, the shoe comprising:
   a plate defined by a superior face and a mount face, the superior face defined by a generally convex shape operable to create suction, the mount face defined by a generally concave shape operable to create suction, wherein said superior face is configured to contact a bottle;
   an interior sidewall surface configured to contact the bottle and disposed to extend from the plate at a plate angle generally between 44 degrees to 110 degrees, the interior sidewall surface having a generally radius-shaped terminus,
   whereby the plate and the interior sidewall surface form a cavity,
   whereby engaging the superior face creates a first air space in the cavity, between the interior sidewall surface and the superior face;
   an exterior sidewall surface disposed to extend from the plate, the exterior sidewall surface configured to circumambulate the interior sidewall surface, and whereby engaging the mount face creates a second air space between the interior sidewall surface and the mount face.

2. The shoe of claim 1, wherein the plate has a generally circular shape.

3. The shoe of claim 1, wherein the convex shape of the superior face is defined by a convexity angle between 1.0 radian to 6.0 radians.

4. The shoe of claim 1, wherein the convex shape of the superior face comprises a convexity angle of about 3.5 radians.

5. The shoe of claim 1, wherein the interior sidewall surface is disposed to extend from the plate at a plate angle generally between 68 degrees to 90 degrees.

6. The shoe of claim 1, wherein the exterior sidewall surface is configured to form a substantially cylindrical shape.

7. The shoe of claim 1, wherein the exterior sidewall surface comprises a generally radius shape defined by an exterior sidewall angle from about 1.0 radian to 6.0 radians.

8. The shoe of claim 1, wherein the material comprising the shoe is selected from the group consisting of silicone, latex, rubber, open cell foam, closed cell foam, urethane, polyurethane elastomer, epoxy, and Santoprene.

9. The shoe of claim 1, wherein the shoe functions to supports the bottle defined by a closed end and a bottle sidewall extending from the closed end forming a unitary structure with an aperture opening into an interior of the bottle, the closed end defined by a generally flat base.

10. The shoe of claim 9, wherein the bottle is a medicine bottle, the medicine bottle comprising a bottle sidewall and a bottle closed end.

11. The shoe of claim 10, wherein the bottle closed end is configured to engage the superior face of the plate.

12. The shoe of claim 1, further including a grip panel configured to at least partially overlay the mount face, the grip panel further configured to help grip the flat ground surface.

13. A bottle support shoe with a suction base, the shoe comprising:

a plate defined by a superior face and a mount face, the superior face defined by a generally convex shape operable to create suction, the mount face defined by a generally concave shape operable to create suction, wherein said superior face is configured to contact a bottle;

an interior sidewall surface configured to contact the bottle and disposed to extend from the plate at a plate angle generally between 44 degrees to 110 degrees, the interior sidewall surface having a generally radius-shaped terminus, whereby the plate and the interior sidewall surface form a cavity, whereby engaging the superior face creates a first air space in the cavity, between the interior sidewall surface and the superior face;

an exterior sidewall surface disposed to extend from the plate, the exterior sidewall surface configured to circumambulate the interior sidewall surface, whereby engaging the mount face creates a second air space between the interior sidewall surface and the mount face;

and a grip panel, the grip panel configured to at least partially overlay the mount face.

14. The shoe of claim 13, wherein the grip panel is configured to help grip a ground surface.

15. The shoe of claim 13, wherein the plate has a generally circular shape.

16. The shoe of claim 13, wherein the convex shape of the superior face comprises a convexity angle of about 3.5 radians.

17. The shoe of claim 13, wherein the interior sidewall surface is disposed to extend from the plate at a plate angle generally between 68 degrees to 90 degrees.

18. The shoe of claim 13, wherein the shoe functions to receive the bottle, wherein the bottle is a medicine bottle % the medicine bottle comprises a bottle sidewall and a bottle closed end.

19. The shoe of claim 18, wherein the medicine bottle closed end is configured to engage the superior face of the plate.

* * * * *